3,297,775
PRODUCTION OF ISOPRENE
Louis J. Croce, East Brunswick, Laimonis Bajars, Princeton, and Maigonis Gabliks, Highland Park, N.J., assignors to Petro-Tex Chemical Corporation, Houston, Tex., a corporation of Delaware
No Drawing. Filed Sept. 18, 1962, Ser. No. 224,543
11 Claims. (Cl. 260—680)

This invention relates to a process for the preparation of isoprene by the demethanation of 2-methylpentene-1.

It is known that isoprene may be produced by the thermal cracking of olefins as well as by the dehydrogenation of isopentane and isopentene. In all of these methods there are various problems and disadvantages which seriously restrict their use on a commercial basis. For example, in the thermal cracking process, there is some coking and hydrocarbon degradation which greatly lowers the yield and purity of the final product. Processes for the dehydrogenation of isopentane to produce isoprene usually require a catalyst regeneration cycle and high operating temperatures. These two factors tend to reduce the activity of the catalyst and result in lower yields and selectivities of isoprene. The production of isoprene by dehydrogenating isopentene has two main disadvantages. One is the costly requirement of pure isopentene and the second is the problem of product purification. The process of separating isoprene from certain isopentene isomers is an involved and expensive procedure.

It is a object of this invention to provide an improved and efficient process for the production of isoprene which avoids the disadvantages of these processes and provides high purity isoprene in high yields. It is further the object of this invention to provide an economical and commercially competitive process for the production of high purity isoprene. Other objects of this invention will be apparent from the disclosure which follows.

It has been found that these objects are attained by the vapor phase thermal demethanation of 2-methylpentene-1, at reduced pressure in the presence of a critical amount of active chlorine atoms and a particular metal catalyst. It was found, quite unexpectedly, that when a mixture of 2-methylpentene-1 and a critical amount of chlorine atoms was passed through a heated reaction zone containing a particular metal catalyst, at reduced pressure, high yields of isoprene were obtained. It would have been expected that, under such conditions, the 2-methylpentene-1 would have cracked at the carbon junction beta to the double bond as taught by the beta scission rule. Thus, it would have been expected that the cracking of 2-methylpentene-1 would have produced predominantly isobutylene and ethylene as discussed in Chemical Engineering Progress, vol. 57, No. 5, pages 43–45. However, according to this invention, 2-methylpentene-1 was selectively cracked at a position gamma to the double bond of the isohexene molecule, thus, producing high yields of isoprene.

Commercial advantages of this invention are both operational and economic. For example, this invention utilizes a feedstock that may be readily and economically obtained by the dimerization of propylene. Also, this invention does not require the 2-methylpentene-1 to be first separated from its other isomers before it is utilized in this demethanation process. The presence of other isomers does not diminish the high isoprene yields that are normally obtained when pure 2-methylpentene-1 is used. Further this invention utilizes in its operation chlorine atoms derived from elemental chlorine or chlorine compounds which are relatively inexpensive and readily available in commercial quantities. The chlorine atoms may be introduced into the reaction zone as chlorine gas, organic chlorides, or as an inorganic chloride solution. This factor simplifies not only the manner of introducing the chlorine atoms into the reaction zone, but also simplifies the recovery and recycle of the source of the chlorine atoms.

An essential feature of this invention is that the gram atom to gram mol ratio of chlorine to 2-methylpentene-1 must be greater than 0.05:1. It has been found that when the gram atom to gram mol ratio of chlorine to 2-methylpentene-1 is below 0.05:1, there is no detectable catalytic advantage in cracking 2-methylpentene-1 to produce isoprene and, in some instances, actually tends to inhibit the formation of isoprene. Good yields of isoprene have been obtained with chlorine to 2-methylpentene-1 gram atom to gram mol ratios of 0.05:1 to 2:1, however, gram atom to gram mol ratios of 0.2:1 to 0.8:1 are preferred. In the practice of this invention, either hydrogen chloride or elemental chlorine is preferably employed as the source of the active chlorine atoms, however, any compound which will decompose in the reaction zone and liberate active chlorine atoms, such as methyl chloride, ammonium chloride, and the like may be used and good results obtained. The use of the term chlorine atoms in the specification and claims refers to atoms of chlorine (Cl) regardless of the source of these chlorine atoms. For example, the introduction of one gram mol of hydrogen chloride or methyl chloride into the reaction zone is equivalent to one gram atom of chlorine or the introduction of one gram mol of elemental chlorine into the reaction zone is equivalent to two gram atoms of chlorine.

Another essential feature of this invention is the use, in the reaction zone, of certain metals and combinations thereof as catalysts. This catalyst is comprised of atoms of elements selected from the group consisting of the Periodic Table [1] Groups VI–B, VII–B, VIII, and mixtures thereof. Although the corresponding halides, oxides, phosphates, hydroxides, sulfates, and the like of these metals may also be employed, the use of elemental metals such as iron, chromium, manganese, nickel, cobalt, and mixtures there are preferred. The use of certain iron alloys, such as stainless steels, containing high percentages of chromium and nickel has resulted in still higher yields of isoprene. Stainless steels of the 300 A.I.S.I. series and specifically the 304 and 316 stainless steels have given excellent yields of isoprene and are preferred. The A.I.S.I. stainless steels referred to in this invention were categorized by the American Iron and Steel Institute. Examples of this classification, as well as other suitable catalytic alloys, may be found in Kirk-Othmer Encyclopedia of Chemical Technology (copyright 1947 by Interscience Publishing Company) in volume 12, pages 821 to 826. Stainless steel of the 300 A.I.S.I. series is preferred, not only for the catalytic characteristics but also for the pronounced resistance to corrosion. This corrosion resistant quality of stainless steel is particularly important in the operation of this invention because of the corrosive characteristics of the halogen, chlorine. The catalytic surface may be present in a variety of forms such as in the form of particles. The amount and size of the catalytic particles may be varied over wide limits depending primarily upon the activity of the particular catalyst and the type of catalyst bed employed. For example, the size of catalyst particles may be varied from about 15 microns to about 2 inches at its broadest point. Generally, the smaller particles are used with fluidized bed. The reaction zone may contain catalysts as such or may contain a mixture of catalyst and some inert material. Good results have also been obtained by using layers consist-

---

[1] All references in this application are to the Periodic Table as found on pages 448–449 of the 41st edition (1959) of the Handbook of Chemistry and Physics (Chemical Rubber Publishing Company).

ing of metal catalysts and an inert material throughout the reaction zone. The amount of solid catalyst utilized in this invention may be widely varied. Generally the amount of catalyst present in the reaction zone will be greater than about 75 square feet of catalytic surface per cubic foot of reaction zone containing the catalyst. Although much higher ratios may be used, it is preferred to utilize at least 150 square feet of catalytic surface per cubic foot of reaction zone containing the catalyst.

Still another essential feature of this invention is that the reaction be conducted at a 2-methylpentene-1 partial pressure of not greater than one-quarter of the total system pressure when the total system pressure is one atmosphere or higher, and less than one-quarter atmosphere when the total system pressure is below one atmosphere. For example, when 2-methylpentene-1 is demethanated to isoprene and methane under a total system pressure of 80 p.s.i., a 2-methylpentene-1 partial pressure of not more than 20 p.s.i. would have to be maintained. Also for example, if the total pressure is one atmosphere or 0.5 atmosphere, a 2-methylpentene-1 partial pressure of not more than 0.25 atmosphere would be necessary. Although a 2-methylpentene-1 absolute pressure as high as 7 atmospheres may be used in this invention, subatmospheric pressures of 2-methylpentene-1 between about 10 mm. of mercury and 380 mm. of mercury absolute are preferred. It is still further preferred to maintain a 2-methylpentene-1 partial pressure of about 15 mm. of mercury absolute to about 200 mm. of mercury absolute. Excellent isoprene yields were obtained, under normal operating conditions, when the 2-methylpentene-1 partial pressure was maintained between about 20 mm. of mercury absolute to about 80 mm. of mercury absolute. It has been found to be particularly advantageous to maintain the desired partial pressure with inert diluents, although a vacuum may be used satisfactorily or, if desired, a combination of the two may be used. In addition to the diluent any compound utilized in producing the active chlorine atoms contributes to maintaining the desired partial pressure of the 2-methylpentene-1. Any material which is substantially inactive in the presence of the other reactants and reaction products may be used as a diluent. Examples of suitable inert diluents that may be used are helium, nitrogen, methane, steam, and the like. Steam has given excellent results and is definitely preferred. The amount of steam utilized in this invention may be varied between about 1:1 to 50:1 mols of steam per mol of 2-methylpentene-1. Mol ratios of between about 5:1 to 30:1 mols of steam per mol of 2-methylpentene-1 are preferred. For example a mole ratio of steam to 2-methylpentene-1 between 10:1 and 20:1 has given excellent yields of isoprene under normal operating conditions.

The maximum temperature in the reaction zone will vary from about 500° C. to 850° C. The reation zone is that segment or portion of the reactor maintained at a temperature greater than 200° C. Although the entire reaction zone may be maintained at a temperature between 500° C. and 850° C., it is generally preferred to maintain at least a portion of the reaction zone at a temperature of less than 500° C. Preferably, the minimum temperature in the reaction zone will be between about 200° C. and 450° C. Thus, according to the preferred mode of this invention, the minimum temperature of the reaction zone will range between about 200° C. and 450° C., and the maximum temperature in the reaction zone will range between 500° C. and 850° C. Also preferably, as the reaction gases pass from the inlet to the exit portion of the reaction zone the minimum temperature will occur prior to the maximum temperature. Generally, the minimum temperature will occur in the inlet two-thirds of the reaction zone and the maximum temperature will occur in the exit two-thirds of the reaction zone. The best results were obtained when the minimum temperature in the reaction zone ranged between 250° C. and 400° C. and the maximum temperature in the reaction zone ranged between 600° C. and 700° C. The temperature in the reaction zone may vary gradually from the minimum temperature to the maximum temperature or the reaction zone may be divided into two or more sections with the section in which the minimum temperature is recorded being in one portion of the reaction zone and the section in which the maximum temperature in the reaction zone is recorded being a different section of the reaction zone. For example, the reaction zone may comprise a single continuous catalytic section or the reaction zone may comprise two or more separate catalytic sections, with the catalyst in the separate sections either being the same or different catalytic materials. The separate catalytic sections in the reaction zone may be separated by a void space or by inert packing.

While the flow rate of the reactants may be widely varied, good results have been obtained with contact or residence times between about 0.01 second and 3 seconds. Generally residence or contact times between about 0.03 second and 0.3 second are preferred. Residence time is the calculated dwell time the reactants spend in the reaction zone calculated at the reaction temperature and pressure, assuming that the volume of feed and the volume of reaction products are the same. The rate of 2-methylpentene-1 introduced into the reaction zone may also be expressed by the term liquid hourly space velocity (LHSV) which is defined as the volume of liquid 2-methylpentene-1 calculated at 25° C. and 760 mm. pressure passing through the reaction zone per hour. LHSV's of between 0.01 and 5 gave good results, but LHSV's of about 0.1 to 2 are preferred.

The 2-methylpentene-1 may be added to the reaction zone separate from the material supplying the chlorine atoms or as a mixture thereof. Preferably the 2-methylpentene-1 and the material supplying the chlorine atoms are heated separately and introduced individually into the reaction zone.

A variety of reactors may be used in the practice of this invention. Generally large diameter tubular reactors which can be easily charged and emptied of catalyst are preferred, but tubular reactors of small diameter may also be used. Any desired reactor that can be efficiently operated without creating excessive flow restrictions or back pressures may be used and good results will be obtained. A fluidized bed type reactor may also be advantageously used in the operation of this invention.

The following specific embodiments are incorporated in the examples. Percent conversion refers to the mols of 2-methylpentene-1 consumed per 100 mols of 2-methylpentene-1 fed to the reactor, percent selectivity represents the mols of isoprene formed per 100 mols of 2-methylpentene-1 consumed, and percent yield refers to the mols of isoprene formed per 100 mols of 2-methylpentene-1 fed. The percent yield of isoprene may also be expressed as the product of percent conversion and percent selectivity. All quantities of chlorine expressed are calculated as gram atoms of chlorine even though the chlorine may have been introduced into the reaction zone as a chlorine compound. All runs were made in a Vycor [2] glass reactor or a 316 stainless steel reactor. Heat was supplied to the reactor by a dual unit electric furnace, each heating unit being 12 inches long and individually controlled by a voltage regulator.

The 2-methylpentene-1 was vaporized and preheated by passing the liquid 2-methylpentene-1 into a stream of superheated steam prior to its introduction into the mixing zone. The steam was generated in a 1 inch internal diameter stainless steel tube approximatley 11 inches

---

[2] The term Vycor is the trademark for a glass manufactured by Corning Glass Works. It is comprised of approximately 96 percent silica which has been chemically washed and fired lishing Company).

long jacketed by an electric furnace and controlled by a voltage regulator. The chlorine atoms were introduced as hydrogen chloride by vaporizing and preheating the hydrogen chloride before it was passed into the mixing zone. The feed mixture consisting of 2-methylpentene-1, steam, and hydrogen chloride was then intermixed and passed through the heated reaction zone. The reaction products were then passed through a warm water condensor which was maintained at a temperature of about 75° C. to condense out most of the steam. This condensor was followed by an ice water trap to remove the higher boiling hydrocarbons which in turn was followed by a Dry Ice-acetone trap which collected the lower boiling materials and the isoprene. The uncondensed gases were measured by means of a wet test meter. Samples of the reaction products were withdrawn from the effluent line at a point between the water condensor and the ice water trap and analyzed in a Perkin-Elmer vapor fractometer Model 154. The isoprene vapor analysis was substantiated by analyzing the lower boiling materials collected in the Dry Ice-acetone trap.

More specifically, the demethanation reactor consisted of either a 1 inch I.D. Vycor tube or 1 inch 316 stainless steel pipe 36 inches in length. The reactor contained three sections. The first and third sections were four and eight inches in length respectively and were located on either end of the 24 inch middle or second section. The two end sections were empty and only the middle section contained the active metal catalyst. This middle or 24 inch section contained the reaction zone of the demethanation reactor while the 4 inch section made up the initial contacting or mixing zone. The 8 inch section was the cooling section of the demethanation reactor. Two electric furnaces, each 12 inches in length, encircled the reaction zone, allowing the two end sections to protrude outside the electric furnaces. The heat generated by the electric furnaces was sufficient to maintain the exposed 4 inch section at a satisfactory preheat temperature while the desired reaction zone temperatures were maintained in the center zone. Temperatures were maintained and controlled by thermocouples attached to an electronic temperature controller and recorder. The thermocouples were located in a thermowell passing through the center of the reaction zone.

*Example 1*

To establish a control, vaporized 2-methylpentene-1 and diluted hydrogen chloride were separately introduced into the mixing zone of a 36 inch long Vycor demethanation reactor. The reactor's 24 inch reaction zone was filled with inactive 6 mm. x 6 mm. Vycor Raschig rings. The upper half of the reaction zone was maintained at a temperature of about 400° C. while the lower half was maintained at 675° C. The reactants were introduced from the top of the reactor into the 4 inch mixing or contacting zone at a liquid hour space velocity (LHSV) of 0.167 with a steam of 2-methylpentene-1 ratio of 20:1. The chlorine atoms were introduced into the reactor as an aqueous solution of hydrogen chloride containing approximately 50 percent HCl by weight. Gram atoms to gram mol ratios of chlorine of 2-methylpentene-1 of 0.52 gram atom of chlorine per gram mol of 2-methylpentene-1 were maintained throughout the run. The reactants were passed through all three sections of the Vycor reactor starting with the 4 inch mixing zone and ending up with the 8 inch cooling zone. The reaction effluent was then passed through a series of cold traps and eventually collected in a Dry Ice-acetone cold trap. The reaction effluent was analyzed at a point between the warm water condensor and the ice water trap. This gas effluent analysis was then checked against the isoprene collected in the Dry Ice-acetone trap. The analysis showed that 75 mol percent of the 2-methylpentene-1 had been cracked to produce an isoprene yield of 18 mol percent with a selectivity of 25 mol percent.

*Example 2*

Example 1 was repeated with two important exceptions. The Vycor reactor was replaced with a 316 stainless reactor of approximately the same dimensions and 304 stainless steel wool replaced the Vycor Raschig rings in the reaction zone. All other conditions were identical to the control run. An analysis of the reactor effluent showed that 48 mol percent of the 2-methylpentene-1 had been cracked producing a 25 mol percent yield of isoprene with a selectivity of about 53 mol percent.

*Example 3*

Example 1 was repeated with the exception that the first five inches of the reaction zone contained Vycor Raschig rings coated with iron powder. The iron powder was deposited on the Vycor Raschig rings as a water slurry and dried in a porcelain dish over a Bunsen burner. The remaining 19 inches of the 24 inch reaction zone contained Vycor Raschig rings. The upper 12 inch section of the reaction zone, which contained the iron powder was maintained at a temperature of 300° C., while the lower 12 inch section of the reaction zone was maintained at 675° C. All other operating conditions were identical to the control run. An analysis of the reactor effluent showed that an isoprene yield of 25 mol percent was obtained with 55 mol percent of the 2-methylpentene-1 being reacted at a selectivity of about 45 mol percent.

*Example 4*

Example 3 was repeated with the exception that the Vycor Raschig rings were coated with a slurry of chromium powder instead of iron powder. All other conditions were held constant. A mol percent conversion, selectivity and yield of 66/51/34, respectively, was obtained.

*Example 5*

Example 3 was repeated with the exception that the metal coated Vycor Raschig rings, occupying the upper 5 inches of the reactor zone, was replaced with loosely packed 304 stainless steel wool. All other conditions were held constant. A mol percent conversion, selectivity, and yield of 68/56/38, respectively, was obtained.

*Example 6*

Example 3 was repeated with the exception that the coated Vycor Raschig rings in the upper 5 inches of the reaction zone and the Vycor Raschig rings located in the lower 8 inches of the reaction zone were replaced with loosely packed 304 stainless steel wool. All other conditions were held constant. An analysis of the reactor effluent indicated that 77 mol percent of the 2-methylpentene-1 feed had been cracked to produce a 46 mol percent yield of isoprene having a selectivity of about 59 mol percent.

Isoprene is useful in the production of polymers, particularly in the production of synthetic rubber.

We claim:

1. A process for the preparation of isoprene which comprises contacting at a temperature of between about 500° C. and 850° C. a mixture consisting essentially of 2-methylpentene-1 and chlorine atoms in the gaseous phase with a catalyst comprising a material selected from the group consisting of chromium, manganese, iron, cobalt and nickel; compounds of chromium, manganese, iron, cobalt, and nickel; and mixtures thereof in amount to provide greater than about 150 square feet of catalyst surface per cubic foot of reaction zone containing catalyst, the partial pressure of the said 2-methylpentene-1 being not greater than one-quarter of the total pressure when the total pressure is one atmosphere or greater, and being less than one-quarter atmosphere when the total pressure is less than one atmosphere, the ratio of said chlorine atoms to said 2-methylpentene-1 being greater than 0.05 gram atom of chlorine per gram mol of 2-methylpentene-1.

2. A process for the preparation of isoprene which comprises contacting at a temperature of between about 500° C. and 850° C. a mixture consisting essentially of 2-methylpentene-1, steam, and chlorine atoms in the gaseous phase with a catalyst comprising a material selected from the group consisting of chromium, manganese, iron, cobalt, and nickel; the halides, oxides, phosphates, hydroxides, and sulfates of chromium, manganese, iron, cobalt, and nickel; and mixtures thereof in amount to provide greater than about 150 square feet of catalyst surface per cubic foot of reaction zone containing catalyst, the partial pressure of the said 2-methylpentene-1 being not greater than one-quarter of the total pressure when the total pressure is one atmosphere or greater, and being less than one-quarter atmosphere when the total pressure is less than one atmosphere, the ratio of said chlorine atoms to said 2-methylpentene-1 being greater than 0.05 gram atom of chlorine per gram mol of 2-methylpentene-1.

3. A process for the preparation of isoprene which comprises contacting at a temperature of between about 500° C. and 850° C. a mixture consisting essentially of 2-methylpentene-1 and chlorine atoms in the gaseous phase with a stainless steel catalyst present in amount to provide greater than 150 square feet of catalyst surface per cubic foot of reaction zone containing catalyst, the partial pressure of the said 2-methylpentene-1 being not greater than one-quarter of the total pressure when the total pressure is one atmosphere or greater, and being less than one-quarter atmosphere when the total pressure is less than one atmosphere, the ratio of said chlorine atoms to said 2-methylpentene-1 being greater than 0.05 gram atom of chlorine per gram mol of 2-methylpentene-1.

4. A process for the preparation of isoprene which comprises contacting at a reaction temperature between about 500° C. and 850° C. a mixture consisting essentially of 2-methylpentene-1 and chlorine atoms in the gaseous phase with a stainless steel catalyst present in amount to provide greater than 150 square feet of catalyst surface per cubic foot of reaction zone containing catalyst at a partial pressure of the said 2-methylpentene-1 between about 15 mm. and 200 mm. of mercury absolute, the ratio of said chlorine atoms to said 2-methylpentene-1 being between about 0.05:1 to 1:1 gram atom of chlorine per gram mol of 2-methylpentene-1.

5. A process for the preparation of isoprene which comprises contacting at a reaction temperature between about 600° C. and 700° C. a mixture consisting essentially of 2-methylpentene-1, chlorine atoms in the gaseous phase and steam with a stainless steel catalyst present in amount to provide greater than 150 square feet of catalyst surface per cubic foot of reaction zone containing catalyst, at a partial pressure of the said 2-methylpentene-1 between about 20 mm. and 80 mm. of mercury absolute, the mol ratio of said chlorine atoms to said 2-methylpentene-1 being between about 0.1:1 to 0.5:1 gram atom of chlorine per gram mol of 2-methylpentene-1, the mol ratio of said steam to the said 2-methylpentene-1 being between about 5:1 to 30:1.

6. A process for the preparation of isoprene which comprises contacting a mixture consisting essentially of 2-methylpentene-1 and chlorine atoms in the gaseous phase in a reaction zone containing a catalyst comprising a material selected from the group consisting of chromium, manganese, iron, cobalt, and nickel; the halides, oxides, phosphates, hydroxides, and sulfates of chromium, manganese, iron, cobalt, and nickel; and mixtures thereof in amount to provide greater than about 150 square feet of catalyst surface per cubic foot of reaction zone containing catalyst, the partial pressure of the said 2-methylpentene-1 being not greater than one-quarter of the total pressure when the total pressure is one atmosphere or greater, and being less than one-quarter atmosphere when the total pressure is less than one atmosphere, the mol ratio of said chlorine atoms to said 2-methylpentene-1 being greater than 0.05 gram atom of chlorine per gram mol of 2-methylpentene-1, the maximum temperature in the reaction zone being from about 500° C. to 850° C. and the minimum temperature in the reaction zone being from 200° C. to 450° C.

7. A process for the preparation of isoprene which comprises contacting a mixture consisting essentially of 2-methylpentene-1 and chlorine atoms in the gaseous phase in a reaction zone containing a stainless steel catalyst present in amount greater than 150 square feet of catalyst surface per cubic foot of reaction zone containing catalyst, the partial pressure of the said 2-methylpentene-1 being not greater than one-quarter of the total pressure when the total pressure is one atmosphere or greater, and being less than one-quarter atmosphere when the total pressure is less than one atmosphere, the ratio of said chlorine atoms to said 2-methylpentene-1 being greater than 0.05 gram atom of chlorine per gram mol of 2-methylpentene-1, the maximum temperature in the reaction zone being from about 500° C. to 850° C. and the minimum temperature in the reaction zone being from 200° C. to 450° C.

8. A process for the preparation of isoprene which comprises contacting a mixture consisting essentially of 2-methylpentene-1 and chlorine atoms in the gaseous phase in a reaction zone containing a catalyst comprising a material selected from the group consisting of chromium, manganese, iron, cobalt, and nickel; the halides oxides, phosphates, hydroxides, and sulfates of chromium, manganese, iron, cobalt, and nickel; and mixtures thereof in amount to provide greater than about 150 square feet of catalyst surface per cubic foot of reaction zone containing catalyst, at a partial pressure of the said 2-methylpentene-1 between about 15 mm. and 200 mm. of mercury absolute, the ratio of said chlorine atoms to said 2-methylpentene-1 being between about 0.05 to 1.0 gram atom of chlorine per gram mol of 2-methylpentene-1, the maximum temperature in the reaction zone being from about 500° C. to 850° C. and the minimum temperature at the inlet to the reaction zone being from 200° C. to 450° C.

9. A process for the preparation of isoprene which comprises contacting a mixture consisting essentially of 2-methylpentene-1, chlorine atoms in the gaseous phase, and steam in a reaction zone containing a stainless steel catalyst present in amount greater than 150 square feet of catalyst surface per cubic foot of reaction zone containing catalyst, at a partial pressure of the said 2-methylpentene-1 between about 20 mm. and 80 mm. of mercury absolute, the ratio of said chlorine atoms to the said 2-methylpentene-1 being between about 0.1:1 to 0.5:1 gram atom of chlorine per gram mol of 2-methylpentene-1, the mol ratio of said steam to the said 2-methylpentene-1 being between about 5:1 to 30:1, the maximum temperature in the reaction zone being about 600° C. to 700° C. and the minimum temperature in the reaction zone being from 250° C. to 400° C.

10. The process of claim 6 wherein the catalyst is chromium.

11. The process of claim 6 wherein the catalyst is iron.

References Cited by the Examiner

UNITED STATES PATENTS

| | | | |
|---|---|---|---|
| 3,205,280 | 9/1965 | Wattimena et al. | 260—680 |
| 3,207,805 | 9/1965 | Gay | 260—680 |
| 3,207,811 | 9/1965 | Bajars | 260—680 |

FOREIGN PATENTS

| | | |
|---|---|---|
| 1,275,949 | 10/1961 | France. |
| 868,566 | 5/1961 | Great Britain. |

PAUL M. COUGHLAN, JR., *Primary Examiner.*